United States Patent
Shi

(10) Patent No.: US 9,874,723 B2
(45) Date of Patent: Jan. 23, 2018

(54) PHOTOGRAPHIC OPTICAL SYSTEM

(71) Applicant: Rongbao Shi, Shenzhen (CN)

(72) Inventor: Rongbao Shi, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 15/353,959

(22) Filed: Nov. 17, 2016

(65) Prior Publication Data

US 2017/0184820 A1    Jun. 29, 2017

(30) Foreign Application Priority Data

Dec. 24, 2015  (CN) .......................... 2015 1 0982115
Jul. 22, 2016   (JP) ................................. 2016-144112

(51) Int. Cl.
 *G02B 13/00* (2006.01)
 *G02B 9/64* (2006.01)
 *G02B 27/00* (2006.01)

(52) U.S. Cl.
 CPC ........... *G02B 13/0045* (2013.01); *G02B 9/64* (2013.01); *G02B 27/0025* (2013.01)

(58) Field of Classification Search
 CPC .......... G02B 13/18; G02B 3/04; G02B 13/04; G02B 13/24; G02B 27/0025; G02B 9/64; G02B 13/00; G02B 9/62; G02B 13/0045; G02B 5/005
 USPC .................................................. 359/708, 755
 See application file for complete search history.

(56) References Cited

U.S. PATENT DOCUMENTS

2017/0176723 A1*  6/2017  Fukaya .............. G02B 13/0045

* cited by examiner

*Primary Examiner* — Bumsuk Won
*Assistant Examiner* — Henry Duong
(74) *Attorney, Agent, or Firm* — Na Xu; IPro, PLLC

(57) ABSTRACT

The present invention discloses a photographic optical system which includes a first lens (focal length f1), a second lens (focal length f2), a third lens (focal length f3), a fourth lens (focal length f4), a fifth lens (focal length f5), a sixth lens (focal length f6) and a seventh lens (focal length f7). The photographic optical system disclosed in the present invention by optimizing rationally face shape, distributing refractive power, selecting optical material, is designed as a big relative stop photographic optical system, and can provide the imaging performance in low illumination environment.

10 Claims, 4 Drawing Sheets

PHOTOGRAPHIC OPTICAL SYSTEM

FIELD OF THE INVENTION

The present invention discloses a photographic optical system, specifically, a photography optical system of portable electronic devices.

DESCRIPTION OF RELATED ART

In recent years, with the vigorous development of mini photographic lens, the demand of mini picturing module is rising. The general camera sensor is either photosensitive coupling component or complementary metal oxide conductive component. With the progress of semiconductor manufacturing technology, the sensor pixel size is smaller. Combined with current development trend of electronic product of better function, light, thin, short and small, as a result, the mini camera with good imaging quality becomes the mainstream of current market.

In the camera sensor lens, the resolution of image gradually increases, pixel size decreases, the lens shall have high resolution and excellent optical performance, for example, wide angle of lens, imaging in high dynamic range, reducing tolerance sensitivity of the lens, etc. The existing camera lens composed of seven pieces of lens, restricted by the structure, is unable to correct further senior aberration, for example spherical aberration, so that the imaging performance is limited.

Therefore, it is necessary to provide a kind of new technology solution to overcome above disadvantage.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

Figure 1:
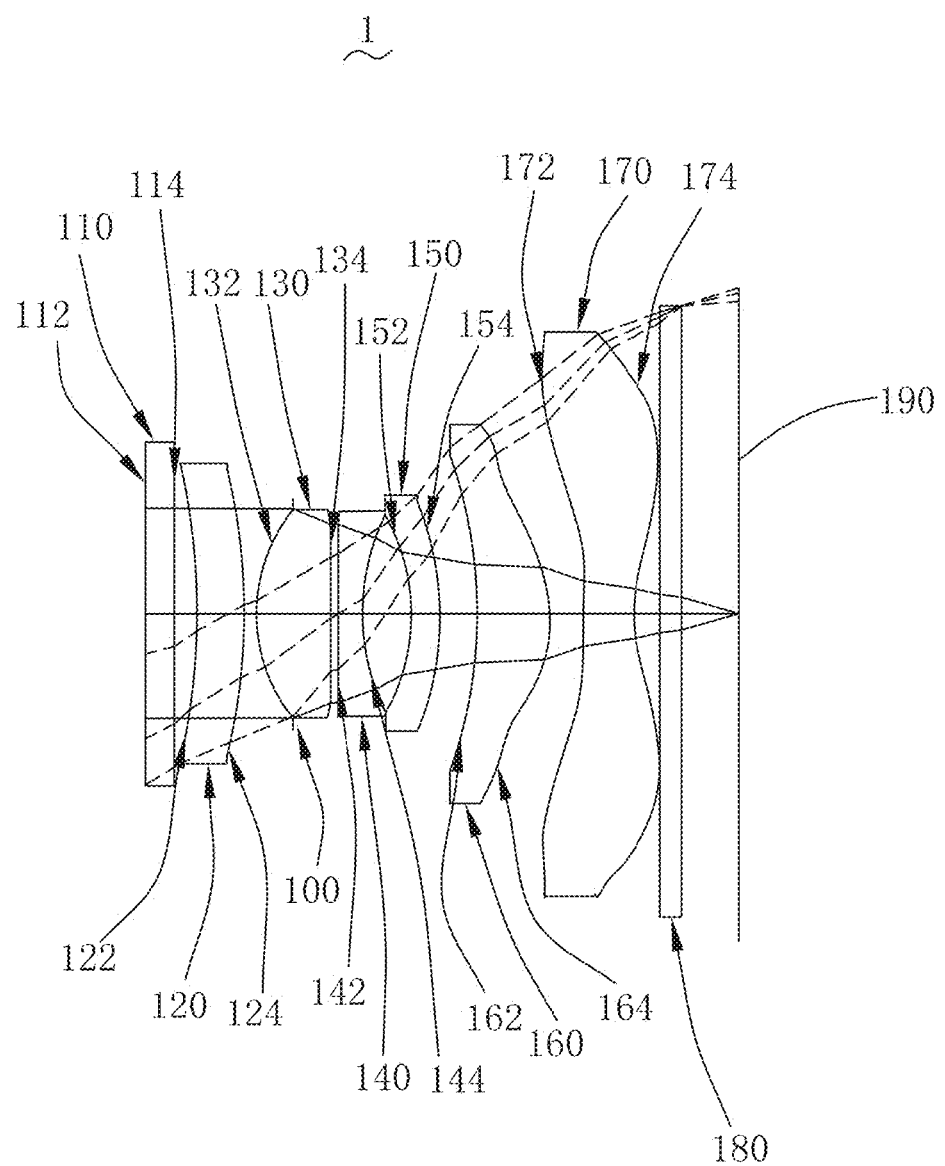
FIG. 1 is an exemplary structural diagram of a photographic optical system of the present disclosure.

FIG. 1 is an exemplary structural diagram of a photographic optical system of the present disclosure. The photographic optical system 1 comprises seven lenses installed coaxially and lined up from the object side to the image side in turn as follows: a first lens 110, a second lens 120, a third lens 130, a fourth lens 140, a fifth lens 150, a sixth lens 160 and a seventh lens 170. In this embodiment, 7 lenses above are plastic lenses.

The first lens 110 is a positive lens and has a positive focal power. The object side surface 112 is convex, made of plastic. The object side surface 112 or/and the image side surface 114 of the first lens 110 is spherical or aspherical.

The object side surface 122 of the second lens 120 is concave and the image side surface 124 is convex. The second lens 120 is made of plastic.

The object side surface 132 of the third lens 130 is convex and the image side surface 134 is concave. The third lens 130 is made of plastic. The object side surface 132 and the image side surface 134 of the third lens 130 are aspherical. The image side surface of the third lens 130 has one point of inflection and one stagnation point.

The object side surface 142 of the fourth lens 140 is convex and the image side surface 144 of the fourth lens 140 is concave, made of plastic. The object side surface 142 and the image side surface 144 of the fourth lens 140 are aspherical. The object side surface of the fourth lens 140 has one point of inflection.

The object side surface 152 of the fifth lens 150 is concave and the image side surface 154 is convex. The fifth lens 150 is made of plastic. The object side surface 152 and the image side surface 154 of the fifth lens 150 are aspherical. The image side surface of the fifth lens 150 has one point of inflection.

The object side surface 162 of the sixth lens 160 is concave and the image side surface 164 is convex. The sixth lens 160 is made of plastic. The object side surface 162 and the image side surface 164 of the sixth lens 160 are aspherical. The image side surface of the sixth lens 160 has one point of inflection and one stagnation point.

The seventh lens 170 is a negative lens. The object side surface 172 of the seventh lens 170 is concave and the image side surface 174 is transferred from concave to convex from optical axis to circumference. The seventh lens 170 is made of plastic. The object side surface 172 and the image side surface 174 of the seventh lens 170 are aspherical. The object side surface 172 of the seventh lens 170 has one point of inflection. The image side surface 174 of the seventh lens 170 has at least one point of inflection and one stagnation point. In this embodiment, the image side surface 174 of the seventh lens 170 has two points of inflection and one stagnation point. In other embodiments, other number of inflection point and the stationary point can be set up as required.

In which, the object side surface is convex, referring that the object side surface toward the object surface is in convex shape. The object side surface is concave, referring that the object side surface toward the object surface is in concave shape. The image side surface is convex, referring that the image side surface toward the image surface is in convex shape. The image side surface is concave, referring that the image side surface toward the image surface is in concave shape.

The combination focal power of the first lens 110 and the second lens 120 is approximate zero focal power, which can correct rationally the spherical aberration, not introduce chromatic aberration and field curvature. The first lens 110 and the second lens 120 meet following condition expression: F12>50 mm or f12<−50 mm. In which, f12: The combination focal length of the first lens and the second lens. The fourth lens 140 and the fifth lens 150 are made of optical material with high refractive index and low abbe number, which can reduce effectively chromatic aberration of the system. The seventh lens 170 is a negative focal power lens, which can reduce effectively the field curvature of the system. By optimizing rationally the surface shape of the seven lens, distributing focal power, selecting optical material, the photographic optical system 1 has good imaging performance under low illumination.

The photographic optical system 1 also includes an aperture 100 and a glass plate 180. The aperture 100 is located at the object side surface 132 of the third lens 130, which can control the amount of light and the depth of field. The glass plate 180 is located at the side of the image side surface 174 of the seventh lens 170. The glass plate 180 can be a filter to filter light. Its type can be selected according to actual requirement. The imaging surface 190 is the imaging surface of the object, located at the side of the glass plate 180 far from the seventh lens 170.

In the photographic optical system disclosed in the present invention, in order to realize the design requirement of miniaturization, high sensitivity, high optical performance and wide view angle of the photographic optical system 1, the first lens 110, the second lens 120, the third lens 130, the fourth lens 140, the fifth lens 150, the sixth lens 160 and seventh lens 170 of the photographic optical system 1 shall meet following condition:

1. Focal Length:

Under the overall structure of the photographic optical system 1, the focal length of the first lens 110, the second lens 120, the third lens 130, the fourth lens 140, the fifth lens 150, the sixth lens 160 and the seventh lens 170 of the photographic optical system 1 shall meet following conditions:

$$30 \text{ mm} < f1 < 80 \text{ mm}, 50 \text{ mm} < f2 < 100 \text{ mm}, 2 \text{ mm} < f3 < 5 \text{ mm}, -10 \text{ mm} < f4 < -2 \text{ mm}, -30 \text{ mm} < f5 < -10 \text{ mm}, 1 \text{ mm} < f6 < 5 \text{ mm}, -5 \text{ mm} < f7 < -1.5 \text{ mm}; \text{ and}$$

$$10 < f1/f < 15, 20 < f2/f < 80, 0.5 < f3/f < 1.5, -2.5 < f4/f < -0.5,$$

$$-10 < f5/f < -2, 0.2 < f6/f < 1.2, -2.5 < f7/f < -0.4; \text{ where,}$$

f1: The focal length of the first lens;
f2: The focal length of the second lens;
f3: The focal length of the third lens;
f4: The focal length of the fourth lens;
f5: The focal length of the fifth lens;
f6: The focal length of the sixth lens;
f7: The focal length of the seven lens;
f: The focal length of whole photography optical system.

2. Refractive Power

Under the overall structure of the photographic optical system 1, the refractive power of the first lens 110, the second lens 120, the third lens 130, the fourth lens 140, the fifth lens 150, the sixth lens 160 and the seventh lens 170 of the photographic optical system 1 shall meet following conditions:

$$1.50 < n1 < 1.55, 1.50 < n2 < 1.55, 1.50 < n3 < 1.55, 1.60 < n4 < 1.70, 1.60 < n5 < 1.70, 1.50 < n6 < 1.55, 1.50 < n7 < 1.55; \text{ where,}$$

n1: The refractive power of the first lens;
n2: The refractive power of the second lens;
n3: The refractive power of the third lens;
n4: The refractive power of the fourth lens;
n5: The refractive power of the fifth lens;
n6: The refractive power of the sixth lens;
n7: The refractive power of the seven lens.

3. Abbe Number

Under the overall structure of the photographic optical system 1, Abbe number of the first lens 110, the second lens 120, the third lens 130, the fourth lens 140, the fifth lens 150, the sixth lens 160 and the seventh lens 170 of the photographic optical system 1 shall meet following conditions:

$$40 < v1 < 60, 40 < v2 < 60, 40 < v3 < 60, 15 < v4 < 30, 15 < v5 < 30, 40 < v6 < 60, 40 < v7 < 60, \text{ where,}$$

v1: Abbe number of the first lens;
v2: Abbe number of the second lens;
v3: Abbe number of the third lens;
v4: Abbe number of the fourth lens;
v5: Abbe number of the fifth lens;
v6: Abbe number of the sixth lens;
v7: Abbe number of the seven lens.

If the focal length, refractive power and Abbe number of the first lens 110, the second lens 120, the third lens 130, the fourth lens 140, the fifth lens 150, the sixth lens 160 and the seventh lens 170 do not meet the conditions above, the chromatic aberration of the photographic optical system 1 may be degraded, and will increase the sensitivity of the photographic optical system 1, difficult to realize the miniaturization and wide view angle of the photographic optical system 1, and is not conducive to reduce cost of the photographic optical system 1.

In this embodiment, the focal length, the refractive power and Abbe number of the first lens 110, the second lens 120, the third lens 130, the fourth lens 140, the fifth lens 150, the sixth lens 160, the seventh lens 170 and the glass plate 180 of the photographic optical system 1 are respectively shown in following table:

TABLE 1

| Type | Focal length (mm) | Refractive power | Abbe number |
| --- | --- | --- | --- |
| Photographic optical system | 3.5 | — | — |
| The first lens | 48.531 | 1.5441 | 56.1 |
| The second lens | 205.301 | 1.5441 | 56.1 |
| The third lens | 2.696 | 1.5441 | 56.1 |
| The fourth lens | −4.704 | 1.651 | 21.5 |
| The fifth lens | −28.019 | 1.651 | 21.5 |
| The sixth lens | 2.237 | 1.5441 | 56.1 |
| The seven lens | −2.002 | 1.5441 | 56.1 |
| Glass plate | ∞ | 1.5168 | 64.16734 |

The continuity of the object side surface and the image side surface, radius of curvature, SAG and semi-diameter SD of the first lens 110 (P1), the second lens 120 (P2), the third lens 130 (P3), the fourth lens 140 (P4), the fifth lens 150 (P5), the sixth lens 160 (P6) and the seventh lens 170 (P7) of the photographic optical system 1 are shown in table 2:

TABLE 2

| Lens | Continuity | Radius of curvature R | | SAG | | Semi-diameter SD |
| --- | --- | --- | --- | --- | --- | --- |
| P1 | Aspherical | R11 | 35.073 | SAG11 | 0.036 | 3.187 |
| | Aspherical | R12 | −107.946 | SAG12 | −0.010 | 2.947 |
| P2 | Aspherical | R21 | −4.065 | SAG21 | −0.268 | 2.841 |
| | Aspherical | R22 | −4.082 | SAG22 | −0.225 | 2.593 |
| P3 | Aspherical | R31 | 1.462 | SAG31 | 0.301 | 1.781 |
| | Aspherical | R32 | 188.828 | SAG32 | 0.006 | 1.752 |

TABLE 2-continued

| Lens | Continuity | Radius of curvature R | | SAG | | Semi-diameter SD |
|---|---|---|---|---|---|---|
| P4 | Aspherical | R41 | 13.929 | SAG41 | 0.049 | 1.722 |
|  | Aspherical | R42 | 2.51 | SAG42 | 0.189 | 1.700 |
| P5 | Aspherical | R51 | −12.776 | SAG51 | −0.156 | 1.691 |
|  | Aspherical | R52 | −42.16 | SAG52 | −0.145 | 1.900 |
| P6 | Aspherical | R61 | −6.256 | SAG61 | −0.144 | 2.822 |
|  | Aspherical | R62 | −1.061 | SAG62 | −0.549 | 3.230 |
| P7 | Aspherical | R71 | −15.029 | SAG71 | −0.370 | 4.017 |
|  | Aspherical | R72 | 1.192 | SAG72 | −0.206 | 4.711 | where,

R11: The curvature radius of the object side surface of the first lens P1.

R12: The curvature radius of the image side surface of the first lens P1.

R21: The curvature radius of the object side surface of the second lens P2.

R22: The curvature radius of the image side surface of the second lens P2.

R31: The curvature radius of the object side surface of the third lens P3.

R32: The curvature radius of the image side surface of the third lens P3.

R41: The curvature radius of the object side surface of the fourth lens P4.

R42: The curvature radius of the image side surface of the fourth lens P4.

R51: The curvature radius of the object side surface of the fifth lens P5.

R52: The curvature radius of the image side surface of the fifth lens P5.

R61: The curvature radius of the object side surface of the sixth lens P6.

R62: The curvature radius of the image side surface of the sixth lens P6.

R71: The curvature radius of the object side surface of the seven lens P7.

R72: The curvature radius of the image side surface of the seven lens P7.

SAG11: the distance from the surface projection point of the first lens on the optical axis to the lens center of the object side surface.

SAG12: the distance from the surface projection point of the first lens on the optical axis to the lens center of the image side surface.

SAG21: the distance from the surface projection point of the second lens on the optical axis to the lens center of the object side surface.

SAG22: the distance from the surface projection point of the second lens on the optical axis to the lens center of the image side surface.

SAG31: the distance from the surface projection point of the third lens on the optical axis to the lens center of the object side surface.

SAG32: the distance from the surface projection point of the third lens on the optical axis to the lens center of the image side surface.

SAG41: the distance from the surface projection point of the fourth lens on the optical axis to the lens center of the object side surface.

SAG42: the distance from the surface projection point of the fourth lens on the optical axis to the lens center of the image side surface.

SAG51 the distance from the surface projection point of the fifth lens on the optical axis to the lens center of the object side surface.

SAG52: the distance from the surface projection point of the fifth lens on the optical axis to the lens center of the image side surface.

SAG61: the distance from the surface projection point of the sixth lens on the optical axis to the lens center of the object side surface.

SAG62: the distance from the surface projection point of the sixth lens on the optical axis to the lens center of the image side surface.

SAG71: the distance from the surface projection point of the seven lens on the optical axis to the lens center of the object side surface.

SAG72: the distance from the surface projection point of the seven lens on the optical axis to the lens center of the image side surface.

The thickness of the first lens 110 (P1), the second lens 120 (P2), the aperture 100 (ST), the third lens 130 (P3), the fourth lens 140 (P4), the fifth lens 150 (P5), the sixth lens 160 (P6), the seventh lens 170 (P7) and the glass plate 180 (Tg) of the photographic optical system 1 is shown in table 3:

TABLE 3

| | Thickness (mm) |
|---|---|
| T1 | 0.300 |
| T12 | 0.318 |
| T2 | 0.468 |
| ST | 0.300 |
| T23 | −0.245 |
| T3 | 0.625 |
| T34 | 0.050 |
| T4 | 0.250 |
| T45 | 0.422 |
| T5 | 0.250 |
| T56 | 0.400 |
| T6 | 0.681 |
| T67 | 0.234 |
| T7 | 0.496 |
| Tg | 0.234 | where,

T1: The thickness of the first lens.

T12: The axial distance from the image side surface of the first lens and the object side surface of the second lens.

T2: The thickness of the second lens.

ST: The thickness of the aperture.

T23: The axial distance from the aperture to the object side surface of the third lens.

T3: The thickness of the third lens.

T34: The axial distance from the image side surface of the third lens and the object side surface of the fourth lens.

T4: The thickness of the fourth lens.

T45: The axial distance from the image side surface of the fourth lens to the fifth lens.

T5: The thickness of the fifth lens.

T56: The axial distance from the fifth lens to the sixth lens.

T6: The thickness of the sixth lens.

T67: The axial distance from the sixth lens to the seventh lens.

T7: The thickness of the seventh lens.

TABLE 4

Relation table between main light angle CRA and the image height of the photographic optical system

| Biggest image height percentage | Image height (mm) | CRA (degree) |
|---|---|---|
| 0.1 H | 0.294 | 5.3 |
| 0.2 H | 0.588 | 10.6 |
| 0.3 H | 0.882 | 15.8 |
| 0.4 H | 1.176 | 20.7 |
| 0.5 H | 1.470 | 25.2 |
| 0.6 H | 1.764 | 28.7 |
| 0.7 H | 2.058 | 30.5 |
| 0.8 H | 2.352 | 30.2 |
| 0.9 H | 2.646 | 28.7 |
| 1.0 H | 2.94 | 26.8 |
| max | — | 30.7 |

In this embodiment, DFOV=78.00°, HFOV=62.40°, VFOV=46.80°, in which: FOV is defined as the biggest view angle range of the photographic optical system, HFOV is defined as horizontal view angle, DFOV is defined as diagonal view angle, VFOV is defined as vertical view angle.

Figure 2:
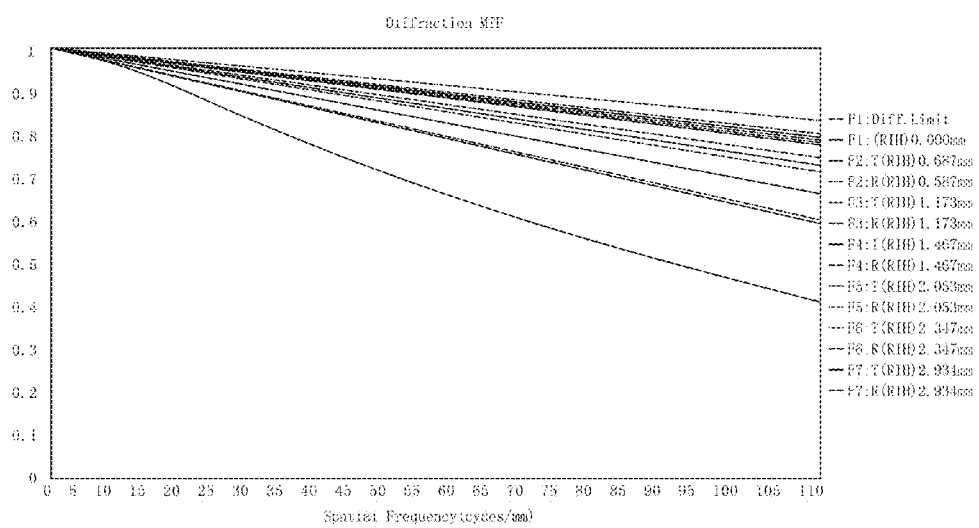
FIG. 2 is an MTF curve diagram of the photographic optical system shown in FIG. 1.
Figure 3:
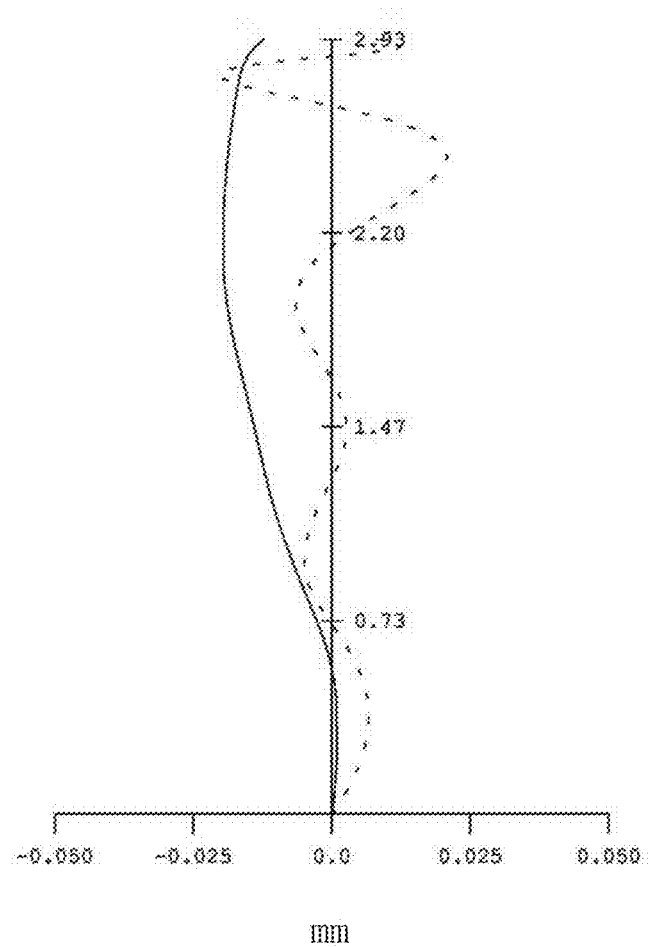
FIG. 3 is a field curvature curve diagram of the photographic optical system in FIG. 1.
Figure 4:
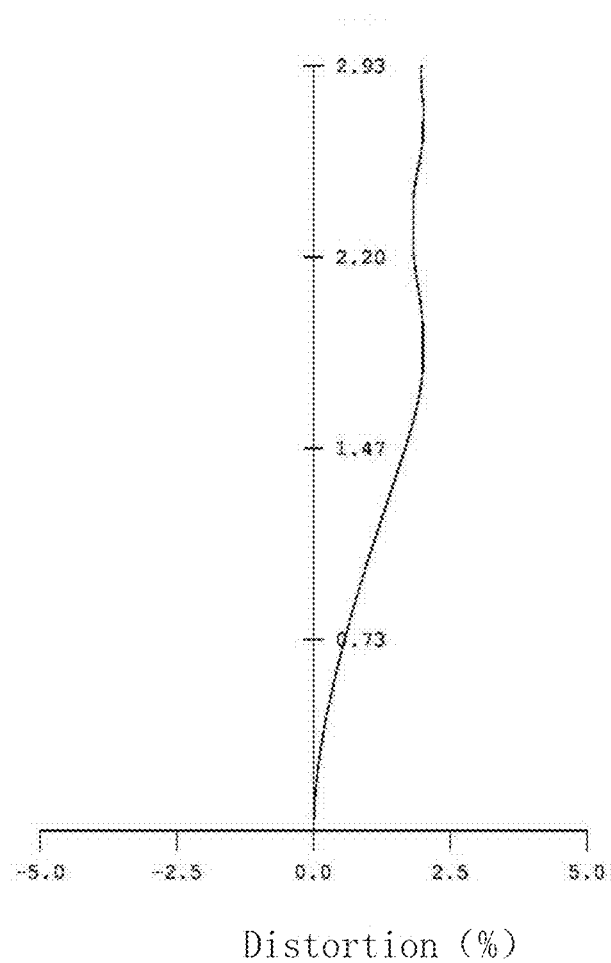
FIG. 4 is a distortion curve diagram of the photographic optical system in FIG. 1.

Please refer also to FIGS. 2-4, the photographic optical system 1 disclosed in the present invention has high optical performance.

In addition, in the photographic optical system 1 disclosed in the present invention, the photographic optical system 1 is designed on the basis of the optical system with large relative aperture, total optical length is less than 5.5 mm, view angle is between 78° to 88°.

The photographic optical system 1 disclosed in the present invention has following beneficial effects:

In the present invention, a big relative aperture photographic optical system is designed by optimizing surface type, distributing focal power, selecting optical material, which can provide the imaging performance in low illumination environment. The image is clear. The combination focal power of the first lens 110 and the second lens 120 is approximate to zero focal power lens, which can correct rationally the spherical aberration, not introduce chromatic aberration and field curvature. The fourth lens 140 and the fifth lens 150 are made of material with high refractive index and low abbe number, which can reduce effectively chromatic aberration of the system. The seventh lens 170 is negative focal power lens which can reduce effectively the field curvature of the system.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A photographic optical system comprising, in an order from an object side to an image side:
a first lens, a second lens, a third lens, a fourth lens, a fifth lens, a sixth lens and a seventh lens; wherein the photographic optical system further meets the following conditions (1)~(7):

$$10<f1/f<15 \tag{1};$$

$$20<f2/f<80 \tag{2};$$

$$0.5<f3/f<1.5 \tag{3};$$

$$-2.5<f4/f<-0.5 \tag{4};$$

$$-10<f5/f<-2 \tag{5};$$

$$0.2<f6/f<1.2 \tag{6};$$

$$-2.5<f7/f<-0.4 \tag{7};$$

where,
f1: The focal length of the first lens;
f2: The focal length of the second lens;
f3: The focal length of the third lens;
f4: The focal length of the fourth lens;
f5: The focal length of the fifth lens;
f6: The focal length of the sixth lens;
f7: The focal length of the seven lens;
f: The focal length of whole photography optical system.

2. The photographic optical system as described in claim 1 further meeting the following conditions (1a)-(7a):

$$30 \text{ mm}<f1<80 \text{ mm} \tag{1a};$$

$$50 \text{ mm}<f2<100 \text{ mm} \tag{2a};$$

$$2 \text{ mm}<f3<5 \text{ mm} \tag{3a};$$

$$-10 \text{ mm}<f4<-2 \text{ mm} \tag{4a};$$

$$-30 \text{ mm}<f5<-10 \text{ mm} \tag{5a};$$

$$1 \text{ mm}<f6<5 \text{ mm} \tag{6a};$$

$$-5 \text{ mm}<f7<-1.5 \text{ mm} \tag{7a}.$$

3. The photography optical system as described in claim 2, wherein the first lens is a positive lens, and the object side surface of the first lens is concave.

4. The photographic optical system as described in claim 2, wherein the seventh lens is a negative lens.

5. The photographic optical system as described in claim 4, wherein the image side surface of the seventh lens has at least one point of inflection and one stagnation point.

6. The photographic optical system as described in claim 1 further meeting the following conditions (1b)-(7b):

$$1.50<n1<1.55 \tag{1b};$$

$$1.50<n2<1.55 \tag{2b};$$

$$1.50<n3<1.55 \tag{3b};$$

$$1.60<n4<1.70 \tag{4b};$$

$$1.60<n5<1.70 \tag{5b};$$

$$1.50<n6<1.55 \tag{6b};$$

$$1.50<n7<1.55 \tag{7b};$$

where,
n1: The refractive power of the first lens;
n2: The refractive power of the second lens;
n3: The refractive power of the third lens;
n4: The refractive power of the fourth lens;
n5: The refractive power of the fifth lens;
n6: The refractive power of the sixth lens;
n7: The refractive power of the seven lens.

7. The photography optical system as described in claim 1 further meeting the following conditions (1c)-(7c):

$$40<v1<60 \quad (1c);$$
$$40<v2<60 \quad (2c);$$
$$40<v3<60 \quad (3c);$$
$$15<v4<30 \quad (4c);$$
$$15<v5<30 \quad (5c);$$
$$40<v6<60 \quad (6c);$$
$$40<v7<60 \quad (7c);$$

where,
v1: Abbe number of the first lens;
v2: Abbe number of the second lens;
v3: Abbe number of the third lens;
v4: Abbe number of the fourth lens;
v5: Abbe number of the fifth lens;
v6: Abbe number of the sixth lens;
v7: Abbe number of the seven lens.

8. The photography optical system as described in claim 1, wherein the first lens and the second lens meet following condition:

$$F12>50 \text{ mm or } f12<-50 \text{ mm};$$

where,
f12: The combination focal length of the first lens and the second lens.

9. The photography optical system as described in claim 1 further meeting the following conditions:

$$TTL<5.5 \text{ mm};$$
$$78°<FOV<88°;$$

where,
TTL: The distance from the object side surface to the imaging surface of the first lens;
FOV: The biggest view angle range of the photographical optical system.

10. The photography optical system as described in claim 1 further including a stop installed on the object side surface of the third lens.

* * * * *